(12) United States Patent
Schimke et al.

(10) Patent No.: US 11,513,983 B2
(45) Date of Patent: Nov. 29, 2022

(54) INTERRUPT MIGRATION

(71) Applicant: International Business Machines Corporation, Armonk, NY (US)

(72) Inventors: Timothy J. Schimke, Stewartville, MN (US); Jesse Arroyo, Rochester, MN (US); Prathima Kommineni, Hyderabad (IN); Vinod Bussa, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 16/874,713

(22) Filed: May 15, 2020

(65) Prior Publication Data

US 2021/0357342 A1 Nov. 18, 2021

(51) Int. Cl.
| | | |
|---|---|---|
| *G06F 11/00* | (2006.01) | |
| *G06F 13/24* | (2006.01) | |
| *G06F 11/07* | (2006.01) | |
| *G06F 9/455* | (2018.01) | |

(52) U.S. Cl.
CPC .......... *G06F 13/24* (2013.01); *G06F 9/45558* (2013.01); *G06F 11/0745* (2013.01); *G06F 11/0751* (2013.01); *G06F 11/0793* (2013.01); *G06F 2009/45579* (2013.01)

(58) Field of Classification Search
CPC ............. G06F 11/0745; G06F 11/0751; G06F 11/0793; G06F 9/45558; G06F 13/24; G06F 2009/45579; G06F 9/1558
USPC ....................................................... 714/1–57
See application file for complete search history.

(56) References Cited

U.S. PATENT DOCUMENTS

| | | | |
|---|---|---|---|
| 7,178,062 B1 * | 2/2007 | Dice ...................... | G06F 9/524 |
| | | | 718/107 |
| 9,715,469 B1 | 7/2017 | Arroyo et al. | |
| 9,720,862 B1 * | 8/2017 | Arroyo .............. | G06F 13/4068 |
| 9,772,868 B2 | 9/2017 | Tu et al. | |
| 9,892,070 B1 | 2/2018 | Arroyo et al. | |
| 9,916,267 B1 | 3/2018 | Arroyo et al. | |
| 10,417,150 B2 | 9/2019 | Arroyo et al. | |
| 2005/0193180 A1 * | 9/2005 | Fujibayashi ............ | G06F 3/067 |
| | | | 711/162 |
| 2006/0010355 A1 * | 1/2006 | Arndt ................... | G06F 11/2736 |
| | | | 714/56 |
| 2006/0159115 A1 * | 7/2006 | Haneda ............... | G06F 11/0793 |
| | | | 370/465 |
| 2017/0109197 A1 | 4/2017 | Coleman et al. | |
| 2017/0139858 A1 * | 5/2017 | Arndt ...................... | G06F 9/542 |
| 2017/0206177 A1 | 7/2017 | Tsai et al. | |
| 2017/0242720 A1 * | 8/2017 | Anand .................. | G06F 3/0619 |
| 2018/0039505 A1 | 2/2018 | Lin | |
| 2018/0349305 A1 * | 12/2018 | Auernhammer ........ | G06F 13/24 |

FOREIGN PATENT DOCUMENTS

WO   2018049567 A1   3/2018

OTHER PUBLICATIONS

Arroyo, et al., "Interrupt Virtualization," U.S. Appl. No. 16/200,438, filed Nov. 26, 2018.

* cited by examiner

*Primary Examiner* — Sarai E Butler
(74) *Attorney, Agent, or Firm* — Peter J. Edwards

(57) ABSTRACT

Apparatuses, methods, program products, and systems are presented for interrupt migration in connection with migration of a logical partition.

20 Claims, 7 Drawing Sheets

INTERRUPT MIGRATION

BACKGROUND

Certain computing devices include large input/output ("I/O") fabrics that incorporate many layers of bridge chips, switches, I/O devices, or the like. The I/O devices themselves may be further virtualized. An interrupt generated by an I/O device must be delivered properly to the owning logical partition for that I/O device. The routing and handling of interrupts involves both hardware and software configuration across many layers of the computing device, including the hypervisor and the logical partition. The logical partition may be made directly aware of which interrupts are associated with which I/O devices. Any changes to these relationships may require the updated configuration mappings to be communicated across all parties. This may limit both configuration flexibility and the ability to reconfigure, for example, due to hardware failure or resource movement. Further complications may arise as a result of logical partition migration between different hosts, as the interrupts associated with particular logical partitions should generally be migrated with those logical partitions when the logical partitions are migrated to different hosts.

SUMMARY

An apparatus, method and program product for interrupt migration are disclosed. According to an embodiment of the present invention, an apparatus includes an adapter module that detects a switch from a first physical input/output ("I/O") adapter coupled to a first host and associated with a logical partition resident in the first host to a second physical I/O adapter coupled to a second host to which the logical partition is being migrated. The apparatus, in further embodiments, includes an interrupt module that updates one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. The apparatus, in certain embodiments, includes an abstraction module that updates physical device information at a hypervisor for the logical partition and resident in the second host to reflect the switch to the second physical I/O device.

In one embodiment, updating the one or more I/O interrupt management structures for the logical partition includes adding I/O interrupt information for the second physical I/O device to one or more I/O interrupt management structures resident in the second host and/or removing interrupt information for the first physical I/O device from one or more I/O interrupt management structures resident in the first host. In further embodiments, the one or more I/O interrupt management structures are part of an external interrupt virtualization engine ("XIVE") architecture.

In one embodiment, one of the one or more I/O interrupt management structures includes an event assignment structure ("EAS") that maps a physical interrupt source number for the second physical I/O adapter to a logical interrupt source number for the logical partition. In certain embodiments, one of the one or more I/O interrupt management structures include an event notification descriptor ("END") structure that defines an interrupt notification routing path for the logical interrupt source number for the second physical I/O adapter. In some embodiments, one of the one or more I/O interrupt management structures includes a notification virtual target ("NVT") structure that tracks I/O interrupt events that use the interrupt notification routing path for the logical interrupt source number for the second physical I/O adapter.

In one embodiment, the apparatus includes a suspend module that suspends I/O interrupt events between the logical partition and the first physical I/O adapter in connection with the migration and prior to switching to the second physical I/O adapter and resumes I/O interrupt events between the logical partition and the second physical I/O adapter in response to updating the one or more I/O interrupt management structures. In some embodiments, the I/O interrupt events between the logical partition and the first physical I/O adapter are suspended in response to detecting an extended error handling ("EEH") event in the first host.

In one embodiment, the I/O interrupt events between the logical partition and the second physical I/O adapter are resumed as part of an EEH recovery event in the second host. In various embodiments, the apparatus includes a configuration module that, during the EEH recovery event, sets a flag indicating completion of the switch from the first physical I/O adapter to the second physical I/O adapter in response to updating the one or more I/O interrupt management structures for the logical partition and the second physical I/O adapter, sends a notification that the switch from the from the first physical I/O adapter to the second physical I/O adapter is complete, and triggers the hypervisor to reset the second physical I/O adapter and update configuration information for the second physical I/O adapter based on the updated physical device information.

In one embodiment, the configuration module is further configured to update one or more internal structures of a device driver for the second physical I/O adapter in response to the driver being aware of physical location information for the second physical I/O adapter. In one embodiment, the abstraction module is configured to update the physical device information at the hypervisor by one or more of updating a device tree and updating device information that is retrievable from the hypervisor. The device information may include communication bus identifiers for the second physical I/O adapter. In some embodiments, the first and second physical I/O adapters include peripheral component interconnect ("PCI") devices that are of a same type.

A method, in one embodiment, includes detecting a switch from a first physical input/output ("I/O") adapter coupled to a first host and associated with a logical partition resident in the first host to a second physical I/O adapter coupled to a second host to which the logical partition is being migrated. In further embodiments, the method includes updating one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. In various embodiments, the method includes updating physical device information at a hypervisor for the logical partition and resident in the second host to reflect the switch to the second physical I/O device.

In one embodiment, updating the one or more I/O interrupt management structures for the logical partition includes adding I/O interrupt information for the second physical I/O device to one or more I/O interrupt management structures resident in the second host and/or removing interrupt information for the first physical I/O device from one or more I/O interrupt management structures resident in the first host. In further embodiments, the one or more I/O interrupt management structures are part of an external interrupt virtualization engine ("XIVE") architecture.

In one embodiment, one of the one or more I/O interrupt management structures includes an event assignment structure ("EAS") that maps a physical interrupt source number for the second physical I/O adapter to a logical interrupt source number for the logical partition. In certain embodiments, one of the one or more I/O interrupt management structures includes an event notification descriptor ("END") structure that defines an interrupt notification routing path for the logical interrupt source number for the second physical I/O adapter. In some embodiments, one of the one or more I/O interrupt management structures includes a notification virtual target ("NVT") structure that tracks I/O interrupt events that use the interrupt notification routing path for the logical interrupt source number for the second physical I/O adapter.

In one embodiment, a computer program product includes a computer readable storage medium having program instructions embodied therewith. The program instructions, in one embodiment, are executable by a processor to cause the processor to detect a switch from a first physical input/output ("I/O") adapter coupled to a first host and associated with a logical partition resident in the first host to a second physical I/O adapter coupled to a second host to which the logical partition is being migrated. The program instructions, in further embodiments, are executable by a processor to cause the processor to update one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. The program instructions, in various embodiments, are executable by a processor to cause the processor to update physical device information at a hypervisor for the logical partition and resident in the second host to reflect the switch to the second physical I/O device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
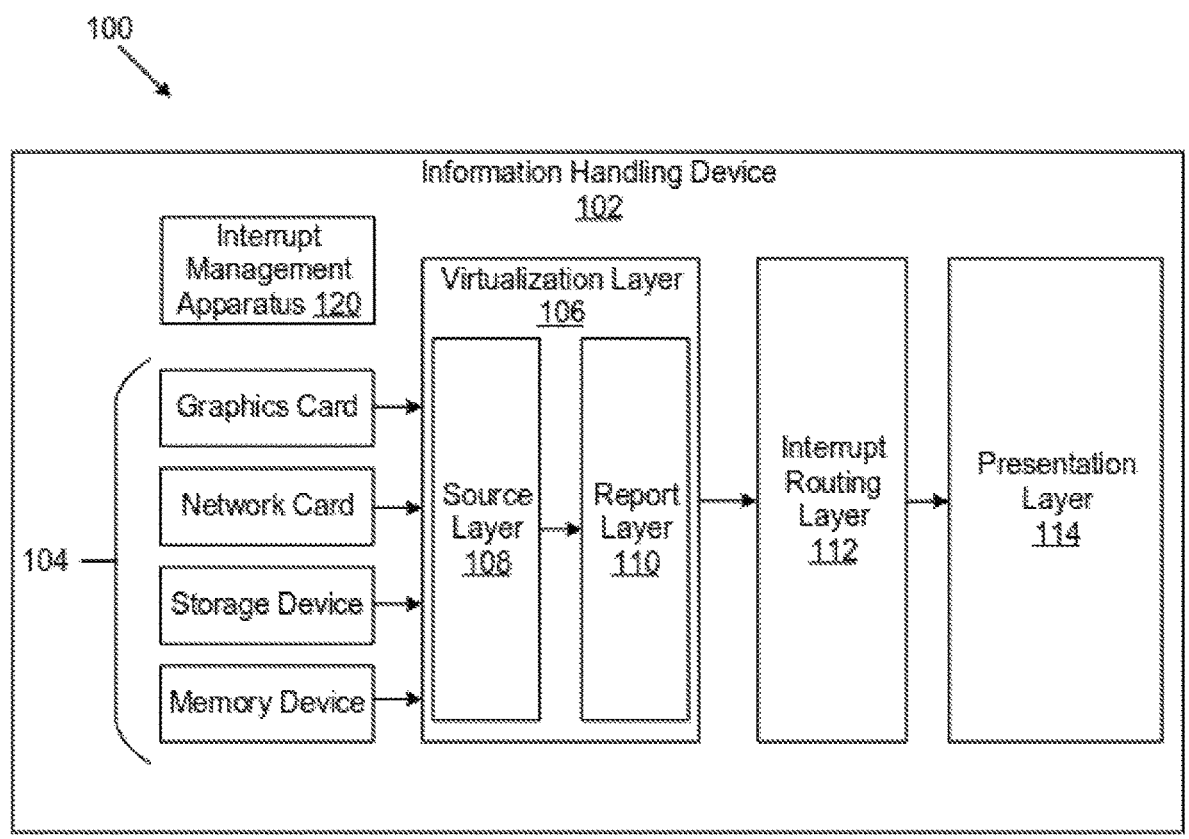
FIG. 1 is a schematic block diagram illustrating one embodiment of a system for interrupt virtualization management.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

According to an embodiment of the present invention, an apparatus includes an adapter module that detects a switch from a first physical input/output ("I/O") adapter coupled to a first host and associated with a logical partition resident in the first host to a second physical I/O adapter coupled to a second host to which the logical partition is being migrated. The apparatus, in further embodiments, includes an interrupt module that updates one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. The apparatus, in certain embodiments, includes an abstraction module that updates physical device information at a hypervisor for the logical partition and resident in the second host to reflect the switch to the second physical I/O device.

In one embodiment, updating the one or more I/O interrupt management structures for the logical partition includes adding I/O interrupt information for the second physical I/O device to one or more I/O interrupt management structures resident in the second host and/or removing interrupt information for the first physical I/O device from one or more I/O interrupt management structures resident in the first host. In further embodiments, the one or more I/O interrupt management structures are part of an external interrupt virtualization engine ("XIVE") architecture.

In one embodiment, one of the one or more I/O interrupt management structures includes an event assignment structure ("EAS") that maps a physical interrupt source number for the second physical I/O adapter to a logical interrupt source number for the logical partition. In certain embodiments, one of the one or more I/O interrupt management structures include an event notification descriptor ("END") structure that defines an interrupt notification routing path for the logical interrupt source number for the second physical I/O adapter. In some embodiments, one of the one or more I/O interrupt management structures includes a notification virtual target ("NVT") structure that tracks I/O interrupt events that use the interrupt notification routing path for the logical interrupt source number for the second physical I/O adapter.

In one embodiment, the apparatus includes a suspend module that suspends I/O interrupt events between the logical partition and the first physical I/O adapter in connection with the migration and prior to switching to the second physical I/O adapter and resumes I/O interrupt events between the logical partition and the second physical I/O adapter in response to updating the one or more I/O interrupt management structures. In some embodiments, the I/O interrupt events between the logical partition and the first physical I/O adapter are suspended in response to detecting an extended error handling ("EEH") event in the first host.

In one embodiment, the I/O interrupt events between the logical partition and the second physical I/O adapter are resumed as part of an EEH recovery event in the second host. In various embodiments, the apparatus includes a configuration module that, during the EEH recovery event, sets a flag indicating completion of the switch from the first physical I/O adapter to the second physical I/O adapter in response to updating the one or more I/O interrupt management structures for the logical partition and the second physical I/O adapter, sends a notification that the switch from the from the first physical I/O adapter to the second physical I/O adapter is complete, and triggers the hypervisor to reset the second physical I/O adapter and update configuration information for the second physical I/O adapter based on the updated physical device information.

In one embodiment, the configuration module is further configured to update one or more internal structures of a device driver for the second physical I/O adapter in response to the driver being aware of physical location information for the second physical I/O adapter. In one embodiment, the abstraction module is configured to update the physical device information at the hypervisor by one or more of updating a device tree and updating device information that is retrievable from the hypervisor. The device information may include communication bus identifiers for the second physical I/O adapter. In some embodiments, the first and second physical I/O adapters include peripheral component interconnect ("PCI") devices that are of a same type.

A method, in one embodiment, includes detecting a switch from a first physical input/output ("I/O") adapter coupled to a first host and associated with a logical partition resident in the first host to a second physical I/O adapter coupled to a second host to which the logical partition is being migrated. In further embodiments, the method includes updating one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. In various embodiments, the method includes updating physical device information at a hypervisor for the logical partition and resident in the second host to reflect the switch to the second physical I/O device.

In one embodiment, updating the one or more I/O interrupt management structures for the logical partition includes adding I/O interrupt information for the second physical I/O device to one or more I/O interrupt management structures resident in the second host and/or removing interrupt information for the first physical I/O device from one or more I/O interrupt management structures resident in the first host. In further embodiments, the one or more I/O interrupt management structures are part of an external interrupt virtualization engine ("XIVE") architecture.

In one embodiment, one of the one or more I/O interrupt management structures includes an event assignment structure ("EAS") that maps a physical interrupt source number for the second physical I/O adapter to a logical interrupt source number for the logical partition. In certain embodiments, one of the one or more I/O interrupt management structures includes an event notification descriptor ("END") structure that defines an interrupt notification routing path for the logical interrupt source number for the second physical I/O adapter. In some embodiments, one of the one or more I/O interrupt management structures includes a notification virtual target ("NVT") structure that tracks I/O interrupt events that use the interrupt notification routing path for the logical interrupt source number for the second physical I/O adapter.

In one embodiment, a computer program product includes a computer readable storage medium having program instructions embodied therewith. The program instructions, in one embodiment, are executable by a processor to cause the processor to detect a switch from a first physical input/output ("I/O") adapter coupled to a first host and associated with a logical partition resident in the first host to a second physical I/O adapter coupled to a second host to which the logical partition is being migrated. The program instructions, in further embodiments, are executable by a processor to cause the processor to update one or more I/O interrupt management structures for the logical partition in connection with migration of the logical partition to the second host such that the logical partition after the migration receives I/O interrupt information from the second physical I/O adapter and not the first physical I/O adapter without the logical partition being aware of the switch to the second I/O adapter. The program instructions, in various embodiments, are executable by a processor to cause the processor to update physical device information at a hypervisor for the logical partition and resident in the second host to reflect the switch to the second physical I/O device.

FIG. 1 is a schematic block diagram illustrating one embodiment of a system 100 for interrupt virtualization management. The system 100, in various embodiments, includes an information handling device 102, which may be embodied as a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the information handling device 102 includes one or more peripheral devices or physical adapters 104 such as graphics cards, network cards, storage devices, memory devise, sound cards, optical drives, universal serial bus ("USB") controllers, and/or the like. The adapters 104 may be coupled to the information handling device 102 to communicate with one or more processors using a communication bus, cable, slot, port, or the like, which may include serial buses, peripheral component interconnect ("PCI") buses, PCI express ("PCIe") buses, accelerated graphics port ("AGP") buses, serial advanced technology attachment ("SATA") buses, external SATA ("eSATA") buses, and/or the like.

In certain embodiments, the information handling device 102 is communicatively coupled to one or more other information handling devices 102 and/or to one or more servers over a data network (e.g., a wired or wireless data network, or some combination of the both). The information handling device 102, in further embodiments, may include processors, processor cores, and/or the like that are configured to execute various programs, program code, applications, instructions, functions, and/or the like. In one embodiment, the information handling device 102 may execute virtualization software, applications, programs, functions, or the like for executing one or more virtual machines, hypervisors, operating system containers, and/or other virtualization components.

In certain embodiments of a virtual environment, physical I/O adapter resources, such as PCIe adapter resources, may be isolated, managed, and shared using a single root I/O virtualization ("SR-My"), which offers different virtual functions for different virtual components on a physical device and allows different virtual machines in a virtual environment to share a single PCIe adapter interface. SR-IOV, as used herein, is an extension to the PCIe specification that allows a device, such as a network adapter, to separate access to its resources among various PCIe hardware functions. These functions may consist of the following types: a PCIe physical function and a PCIe virtual function.

As used herein, a PCIe physical function is a PCI function that supports the SR-IOV capabilities as defined by the SR-IOV specification. A physical function may contain the SR-IOV capability structure and manages the SR-IOV functionality. Physical functions are fully featured PCIe functions that can be discovered, managed, and manipulated like any other PCIe device. Physical functions can be used to configure and control a PCIe device.

A virtual function, as used herein, is a PCI function that is associated with a physical function. A virtual function is a lightweight PCIe function that shares one or more physical resources with the physical function and with virtual functions that are associated with that physical function. Unlike a physical function, a virtual function can only configure its own behavior.

The physical function may advertise the device's SR-IOV capabilities, and each virtual function may be associated with a device's physical function. A virtual function may share one or more physical resources of the device, such as a memory and a network port, with the physical function and other virtual functions on the device. From the perspective of a logical partition instantiated by a hypervisor, a virtual function may appear as a fully functional physical PCIe adapter 104. In this manner, a single physical adapter 104 may be "shared" amongst many logical partitions or multiple virtual functions may be instantiated for use by a single logical partition.

Thus, the physical I/O adapters 104 may be implemented as SR-IOV adapters. Any of the example physical I/O adapters 104 may be configured to support SR-IOV and provide multiple virtual functions, where each of the virtual functions may be mapped to a respective logical partition or virtual machine. In this manner, each of the logical partitions may independently use a physical network adapter that is being shared among different logical partitions.

In an embodiment where the information handling device 102 executes a virtualization infrastructure, architecture, or environment, the virtualization environment may implement input/output ("I/O") interrupt virtualization for virtualizing I/O interrupts generated by an adapter 104. As used herein, an interrupt is a signal that is emitted by hardware (or software such as firmware or a device driver) indicating an event that needs immediate attention. An I/O interrupt, therefore, may refer to a signal that an I/O adapter 104 generates (either by the hardware or by the firmware of the adapter 104) to indicate an I/O event that needs attention.

In certain embodiments, in a virtualized environment where multiple different virtual machines or other logical partitions are sharing, consuming, using, or the like physical resources such as physical I/O adapters 104, I/O interrupts that the I/O adapters 104 generate may need to be routed to the target virtual machine and virtualized (e.g., by the hypervisor) for the particular virtual machine because each virtual machine may have different interrupt interfaces, data types, data structures, functions, methods, processes, applications, application programming interfaces ("APIs") or the like for processing I/O interrupts (e.g., there may need to be a conversion or translation from a physical interrupt identifier, e.g., a physical interrupt source number ("PISN") to a logical interrupt identifier, e.g., a logical interrupt source number ("LISN") for a virtual machine).

When configuring a logical partition or virtual machine for interrupts with a physical I/O adapter 104, the hypervisor, upon instantiation of the logical partition may assign to the logical partition a number of LISNs, where each of the LISNs map to a corresponding PISN. The PISN, as used herein, may include a number, an identifier, a string, and/or any other unique identifier that represents an interrupt raised in a processor by an I/O adapter 104. Such interrupts may be raised through various busses and in various ways.

For example, some physical interrupts may be raised by asserting, by an adapter 104, a signal on a line of a bus dedicated for such interrupts or by sending a Message Signaled Interrupt ("MSI") or MSI extended ("MSI-X") message to the processor over the main system bus (through a PCI host bridge, for example) rather than on a dedicated interrupt line. Such MSI and MSI-X messages may be associated with a PISN. That is, each I/O adapter 104 may send out an MSI or MSI-X message to raise an interrupt, the content of the message may indicate the source of the message and be associated with at least one PISN. The processor may then raise an interrupt with the PISN. The interrupt my cause system firmware, such as the hypervisor, to handle the interrupt. The hypervisor may determine which logical partition to direct the interrupt based on a mapping of PISNs to LISNs, where each LISN is assigned to a logical partition.

One example virtualization architecture for virtualizing interrupt interfaces includes the external interrupt virtualization engine ("XIVE"), which, instead of routing interrupts to a specific physical thread or group of physical threads, interrupts specify a virtual processor or a group or virtual processors (as used herein, a virtual processor is a representation of a physical processor or processor core to the operating system of a virtual machine or other logical partition that uses shared processors). In this manner, interrupt routing structures for the physical interrupts are static and interrupt routing is done by hardware using live per-thread virtual processor information. In one embodiment, the XIVE architecture is configured to execute on an IBM® POWER® processor such as an, IBM POWER9® system, or the like.

For instance, as illustrated in FIG. 1, interrupt delivery may be separated into a virtualization layer 106, an interrupt routing layer 112, and a presentation layer 114. The virtualization layer 106 may include a source layer 108 and a report layer 110. The source layer 108, for instance, defines the coalescing, routing, and virtualization of triggers from individual interrupt sources, e.g., I/O adapters 104. The report layer 110, in one embodiment, logs the interrupts, notifies the target logical partition/virtual machine about outstanding interrupts, and/or handles potential escalations. The presentation layer 114 may include a thread interrupt management area ("TIMA") and a backlog structure that stores information about pending interrupts that need to be presented to the target logical partition/virtual machine. The TIMA may include information about virtual processors and users currently dispatched on physical threads in the system as well as information about currently presented and pending interrupts, whereas the backlog is used when interrupts cannot be delivered to the target immediately.

XIVE, in one embodiment, is configured to deliver, route, transmit, send, and/or the like interrupt information based on virtual processor target information. A virtual processor may execute on a single physical thread; however, each physical thread is normally associated with several virtual processor numbers, e.g., one to direct interrupts to an operating system running in a logical partition/virtual machine and another to route interrupts to the hypervisor running on the thread. Each processor thread may be statically assigned a virtual processor number to handle cases in which an interrupt needs to be routed to a specific physical thread. Interrupts can target a specific virtual processor, virtual processor group, a user process within a logical partition/virtual machine using a combination of a virtual processor group/number and a user process ID. In certain embodiments, the TIMA is embodied as a set of memory mapped I/O ("MMIO") registers, or the like, for each physical thread in the system. Interrupt information may be stored in and accessed from the TIMA, within the presentation layer 114, on the basis of a virtual processor, virtual processor group, physical thread, logical partition, user process, or the like.

The interrupt management apparatus 120, in one embodiment, is configured to dynamically update, refresh, configure, or the like various data structures, mappings, or the like for interrupt virtualization when a physical adapter 104 is switched, removed, added, updated, reconfigured, moved, installed, or the like without the logical partition being aware of the switch. For example, if the currently active network card on a server, e.g., the network card that is being used by the logical partitions/hypervisor for network transmissions, is switched to a different network card (e.g., due to a hardware failure, an updated version of the network card being installed, or the like), the interrupt management apparatus 120 may dynamically update the underlying logical data structures that maintain the mappings of PISNs to LISNs and vice versa without the logical partitions, virtual machines, operating systems, hypervisor, or the like being aware of the switch. In other words, the interrupt management apparatus 120 updates the interrupt management structures for mapping and routing I/O interrupts from a physical I/O adapter 104 to a target logical partition when the physical I/O adapter 104 is changed for a different physical I/O adapter 104 with the target logical partition being unaware of the change (e.g., allowing the operating system of the logical partition to believe it is still connected to the original physical I/O adapter 104).

Thus, in one embodiment, the interrupt management apparatus 120 detects a switch from a first physical I/O adapter 104 that is associated with a logical partition to a second physical I/O adapter 104 associated with the logical partition, updates one or more I/O interrupt management structures for the logical partition so that the logical partition receives I/O interrupt information from the second physical I/O adapter 104 and not the first physical I/O adapter 104 without the logical partition being aware of the switch to the second I/O adapter 104, and updates physical device information at a hypervisor for the logical partition to reflect the switch to the second physical I/O device. In this manner, the interrupt management apparatus 120 improves upon conventional interrupt virtualization technologies by providing dynamic and seamless interrupt virtualization reconfiguration without user input, operating system input, or the like so that logical partitions can continue to execute when a physical I/O adapter 104 is changed without shutting down or restarting the logical partition, manually reconfiguring I/O interrupt management structures/mappings or a hypervisor, restarting a server or host device, and/or the like.

In various embodiments, the interrupt management apparatus 120 may be embodied as a hardware appliance that can be installed or deployed on an information handling device 102, on a server 108, or elsewhere on the data network 106. In certain embodiments, the interrupt management apparatus 120 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi™, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the interrupt management apparatus 120 may include a power interface, a wired and/or wireless network interface, a graphical interface that attaches to a display, and/or a semiconductor integrated circuit device as described below, configured to perform the functions described herein with regard to the interrupt management apparatus 120.

The interrupt management apparatus 120, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the interrupt management apparatus 120 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the interrupt management apparatus 120.

The semiconductor integrated circuit device or other hardware appliance of the interrupt management apparatus 120, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the interrupt management apparatus 120 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

Figure 2:
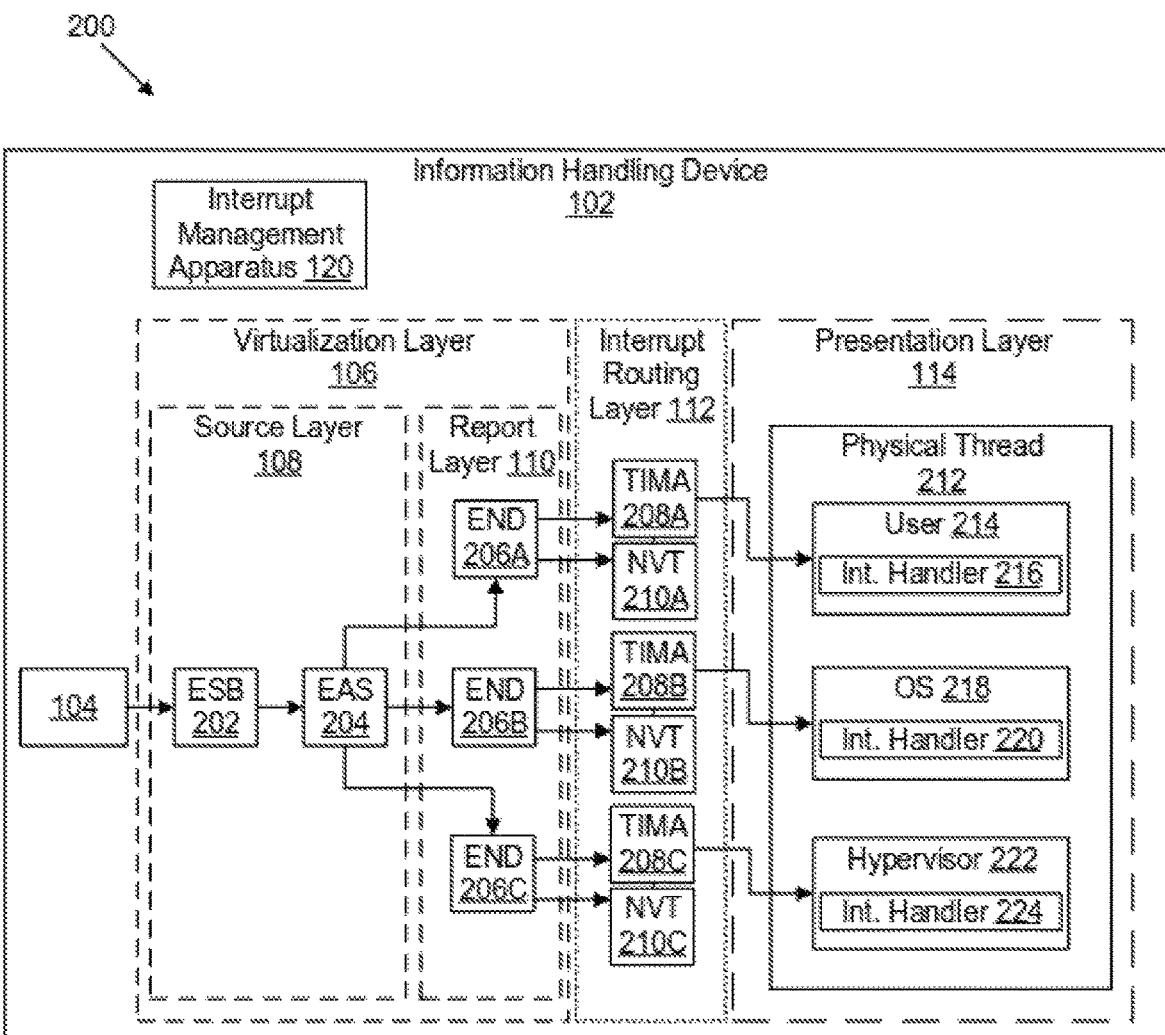
FIG. 2 is a schematic block diagram illustrating one embodiment of another system for interrupt virtualization management.

FIG. 2 is a schematic block diagram illustrating one embodiment of another system 200 for interrupt virtualization management. The system 200 may be substantially similar to the system 100 described above with reference to FIG. 1 and may implement a version of XIVE for interrupt virtualization. For instance, the information handling device 102 may be a server hosting a plurality of different logical partitions, virtual machines, hypervisors, virtual containers, and/or the like. The interrupt management apparatus 120 may dynamically act on, work with, manage, update, migrate, manipulate, or the like the various XIVE I/O interrupt management structures, described below, in response to a switch or change in an active physical peripheral I/O adapter 104 of the server.

In one embodiment, in the XIVE architecture, system events such as I/O interrupts from an I/O adapter 104 are processed in the source layer 108. In some embodiments, multiple I/O interrupts from the same I/O adapter 104 are coalesced so that only one presentation from the I/O adapter is outstanding at any given point. The coalescing may be done using a 2-bit event state buffer ("ESB") 202 per I/O adapter 104. Two MMIO space pages may be associated with each ESB 202. The first page may be intended for use by the interrupt source or producer, e.g., the physical I/O adapter 104 associated with the ESB 202, and any store operation triggers the ESB state machine. The second page may be intended for use by the interrupt server or consumer, e.g., a logical partition or virtual operating system, and may be used for end-of-interrupt ("EOI") operations but can also be used to explicitly control the state buffer state. This mapping may provide protection between the producer and consumer as well as isolation between users of different interrupt sources because the hypervisor has full control over the memory mapping of the pages. It may also provide a lightweight mechanism to attach new I/O adapters 104 or other interrupt sources because the only requirement is that the latter can create a store on the Symmetric Multiprocessor ("SMP") bus to an ESB trigger page.

In one embodiment, interrupts are assigned a virtual source number and routed through a notification path. The event assignment structure ("EAS") 204, in certain embodiments, associated 1-to-1 with each ESB 202 contains the necessary assignment information. Assigning a virtual source number may allow physical I/O adapters 104 to be remapped at run time without impact on the consumer, enabling in particular live migration of logical partitions.

In one embodiment, the results of the source layer 108 operations are forwarded to the report layer 110. Each interrupt target and priority combination has its own event notification descriptor ("END") 206A-C (collectively 206) containing interrupt routing and processing instructions, e.g., source information, destination information, interrupt type, interrupt data, interrupt priority, and/or the like. XIVE, for example, defines eight interrupt priority levels (values 0-7) such that every virtual processor or virtual processor group typically has eight ENDs 206 associated with them, one for each priority. In further embodiments, each END 206 may be associated with an event queue ("EQ") where a virtual source identifier is logged in memory. The EQs, in one embodiment, use an invert valid bit on wrap mechanism so that there is no synchronization required between the interrupt handler and the I/O adapter 104. For example, the server may simply scan the EQ until it no longer finds a valid element.

In certain embodiments, the interrupt routing layer 112 includes a TIMA 208A-C (collectively 208) for each END 206 that is used to store and present interrupts to the target interrupt handler in the presentation layer 114 of a logical partition an interrupt handler 216 for a user process 214, an interrupt handler 220 for an operating system 218, or an interrupt handler 224 for a hypervisor 222. The interrupt routing layer 112 may notify the intended interrupt handler of the I/O interrupt and includes the virtual processor routing information from the corresponding END 206. Furthermore, in certain embodiments, the interrupt routing layer 112 includes a notification virtual target ("NVT") 210A-C (collectively 210) for each corresponding END 206 that is used to log information, e.g. routing information, priority information, or the like, about I/O interrupts, stored in the corresponding TIMA 208, that are missed or otherwise not presented to the target interrupt handler 216, 220, 224.

Each of the I/O interrupt management structures described above the ESB 202, EAS 204, the END 206, the TIMA 208, and the NVT 210 are used for processing an I/O interrupt that an I/O adapter 104 generates and routing the interrupt information to the interested virtual target logical partition, virtual machine, virtual container, hypervisor 222, operating system 218, user process 214, or the like. Accordingly, as described above, each I/O interrupt management structure may include a table, mapping, list, database, or other data structure that maps a PISN assigned to the interrupt that the I/O adapter 104 generates to a LISN that the logical partition consumes. For instance, when a network adapter generates an interrupt, e.g., for sending network data to a virtual machine, the interrupt is assigned a PISN, e.g., by the CPU. The PISN is then provided to the source layer 108 where it is converted, translated, or the like to a corresponding LISN that the logical partition can use. The PISN and/or LISN may be used by the ESB 202, EAS 204, END 206, TIMA 208, NVT 210, or the like to generate interrupt routing information for the I/O interrupt, deliver or present the I/O interrupt to the target, and/or log information for the interrupt.

However, if the underlying hardware changes, e.g., if an I/O adapter 104 is switched on a server, then new or different PISNs may be assigned to the interrupts for the new I/O adapter 104. Accordingly, each I/O interrupt management structure may now include different or out-of-sync information that does not correspond to the new PISNs. For example, existing mappings of PISNs to LISNs may not reflect the PISNs for the new I/O adapter 104, and thus the existing mappings may be incorrect or may not even include a mapping for a given PISN. Such a change may trickle through to the routing path at the END 206, storage at the TIMA 208, the presentation operations at the NVT 210, and/or other I/O interrupt management structures that are based on either PISNs, LISNs, or a combination of both.

Figure 3:
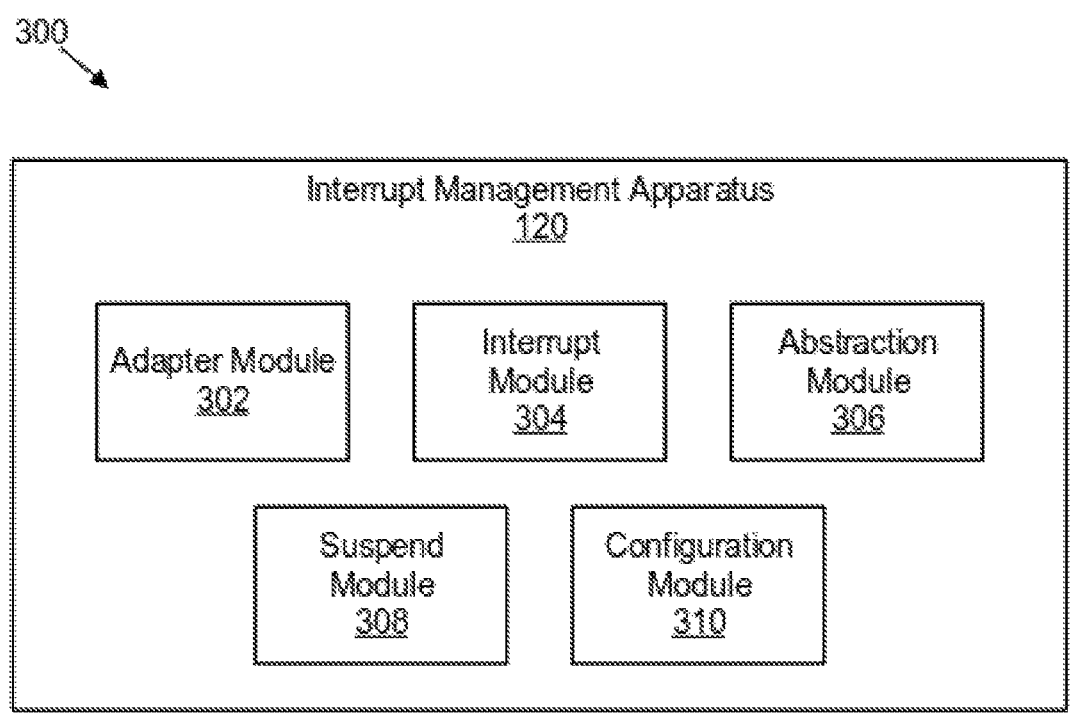
FIG. 3 is a schematic block diagram illustrating one embodiment of an apparatus for interrupt virtualization management.

FIG. 3 is a schematic block diagram illustrating one embodiment of an apparatus 300 for interrupt virtualization management. The apparatus 300 includes an instance of an interrupt management apparatus 120. The interrupt management apparatus 120 includes an adapter module 302, an interrupt module 304, an abstraction module 306, a suspend module 308, and a configuration module 310, which are described in more detail below.

The adapter module 302, in one embodiment, is configured to detect a switch from a first physical I/O adapter 104 associated with a logical partition to a second physical I/O adapter associated with the logical partition 104. The adapter module 302, for instance, may receive a signal, message, notification, or the like over a communication bus that indicates that an existing physical I/O adapter 104 has been removed and that a new physical I/O adapter 104 has been installed in its place. For example, the adapter module 302 may detect when an existing graphics card is replaced with a different graphics card.

The switch may occur while the information handling device 102 is powered-off, in which case the adapter module 302 may detect the change in the I/O adapter 104 when the information handling device 102 is powered on. In certain embodiments, the switch may happen while the information handling device 102 is executing, e.g., if the device, port, slot, bus, or the like allows for hot-swappable devices.

In one embodiment, the interrupt module 304 is configured to update one or more I/O interrupt management structures ESB 202, EAS 204, END 206, TIMA 208, NVT 210 for the logical partition in response to the adapter module 302 detecting the switch in I/O adapters 104. As described above, the interrupt module 304 may update, overwrite, refresh, revise, or the like mapping tables, lists, or other data structures that maintain a mapping of PISNs to LISNs and vice-versa, that maintain interrupt routing and notification information based on PISNs and/or LISNs, and/or the like. For example, when a new network adapter is installed in a server in place of an existing network adapter, the new network adapter may be assigned or otherwise associated with different PISNs, which the interrupt module 304 receives and uses to update the I/O management structures for the interrupt virtualization for the logical partition.

In one embodiment, the interrupt module 304 updates the I/O interrupt management structures without the logical partition being aware of the switch to the different I/O adapter 104 so that the logical partition it is still using the original I/O adapter 104 or one or more virtual functions of the I/O adapter 104. In other words, the interrupt module 304 migrates a logical partition's interrupts for a physical I/O adapter 104 to the new physical I/O adapter 104 in a manner that preserves data integrity and logical partition operation while preventing the operating system, for example, executing on the logical partition from having specific support for the migration and allowing the operating system to think it is still connected to the original physical I/O adapter 104.

In one embodiment, the interrupt module 304 updates the I/O interrupt management structures for the logical partition by adding I/O interrupt information for the second or new physical I/O adapter 104 to the one or more I/O interrupt management structures. For instance, the interrupt module 304 may add entries in a mapping of PISNs to LISNs to reflect new PISNs for the new I/O adapter 104. In another example, the interrupt module 304 may add entries to data structures the describe interrupt routing paths and/or notification information for the new I/O adapter 104.

In further embodiments, the interrupt module 304 updates the I/O interrupt management structures for the logical partition by removing I/O interrupt information for the first or original physical I/O adapter 104 from the one or more I/O interrupt management structures. For instance, the interrupt module 304 may remove entries in a mapping of PISNs to LISNs that are associated with the first or original I/O adapter 104 that was removed. In another example, the interrupt module 304 may remove entries from data structures the describe interrupt routing paths and/or notification information for the first or original I/O adapter 104 to prevent potential conflicts with an old or unavailable routing or notification path.

In one embodiment, the abstraction module 306 updates physical device information at a hypervisor for the logical partition to reflect the switch to the second physical I/O device 104. The abstraction module 306, for instance, may update a device tree and/or other information that a logical partition retrieves from the CPU, the BIOS or other firmware, the operating system, the hypervisor or other virtualization manager or the like via function calls, shared memory, an application programming interface ("API"), or the like to reflect changes to the I/O adapters 104, communication bus identifiers, slot identifiers, or the like where the new I/O adapter 104 is installed and where the old I/O adapter 104 is removed.

The abstraction module 306, for example, may add device information for the new I/O adapter 104 to the device tree including the device type, the communication bus identifier for the communication bus that is used to communicate with the I/O adapter 104, an identifier for the device, firmware version for the device, and/or the like. Similarly, the abstraction module 306 may remove device information from the device tree for the original I/O adapter 104 that is removed and replaced with the new I/O adapter 104. In this manner, the hypervisor, or other virtualization manager between the logical partition and the hardware has up-to-date information for the new I/O adapter 104 and can abstract the hardware information for the logical partition.

In one embodiment, the suspend module 308, is configured to suspend I/O interrupt events between the logical partition and the first or original physical I/O adapter 104 prior to switching to the second or new physical I/O adapter 104. For instance, in response to the adapter module 302 detecting removal of an existing I/O adapter 104 and the installation of a new physical I/O adapter 104, the suspend module 308 may suspend, freeze, queue, log, or the like I/O interrupt events from the new physical I/O adapter 104 so that the logical partition does not receive I/O interrupt events. In certain embodiments, the suspend module 308 suspends execution of the logical partition until the I/O interrupt management structures have been updated to reflect the new I/O adapter 104.

The suspend module 308, in further embodiments, resumes I/O interrupt events between the logical partition and the new physical I/O adapter 104 in response to the interrupt module 304 updating the one or more I/O interrupt management structures to reflect the change to the new I/O adapter 104. In this manner, interrupt event PISNs can be mapped to the correct LISNs and routed to the correct target destination (e.g., logical partition, operating system, hypervisor, user program, or the like) without being disregarded, ignored, or sent to an incorrect target.

In certain embodiments, the suspend module 308 suspends I/O interrupt events as part of an extended error handling ("EEH") event. As used herein, an EEH event is an error event that occurs within an I/O domain as part of a PCI or other communication bus infrastructure. An EEH event may include detection of a failure in an I/O adapter 104, detection of removal of an I/O adapter 104, and/or the like. Thus, in light of the subject matter herein, the EEH event may include detecting the removal of an I/O adapter 104 prior to the switch to a new I/O adapter 104 and/or detecting the installation of a new I/O adapter 104.

In such an embodiment, after the interrupt module 304 updates the I/O interrupt management structures, the suspend module 308 may resume the I/O interrupt events as part of, in response to, in conjunction with, or the like an EEH recovery event. The EEH recovery event may include asserting, de-asserting, resetting, reconfiguring, initializing, or the like the I/O adapter 104 that triggered the EEH event; verifying the interrupt handler 216, 220, 224 information to confirm that the interrupt handlers are still valid; triggering the device driver of the logical partition for the I/O adapter 104 to update internal device information; and/or the like.

In one embodiment, the configuration module 310 is configured to, during the EEH recovery event, unconfigure the first physical I/O adapter 104 so that it is no longer visible to the logical partition. For instance, the configuration module 310 may remove or delete any symbolic links, virtual functions, PISNs, references, or the like to the first I/O adapter 104 at the logical partition. In further embodiments, the configuration module 310 sets a flag indicating completion of the switch from the first physical I/O adapter 104 to the second physical I/O adapter 104 in response to the interrupt module 304 updating the one or more I/O interrupt management structures for the logical partition and the second physical I/O adapter 104. The configuration module 310, for example, may set a flag in the EEH freeze data that indicates that the migration to the new I/O adapter 104 is complete, meaning that the I/O interrupt management structures have been updated and the new I/O adapter 104 is usable. The flag may be stored in the hypervisor or other virtualization manager, in the logical partition, at the hardware level (e.g., in the BIOS, firmware, registers, or the like), and/or the like.

In some embodiments, the configuration module 310 is further configured to send a notification that the switch from the from the first physical I/O adapter 104 to the second physical I/O adapter 104 is complete. For example, the configuration module 310 may send a signal, message, or the like to the hypervisor, logical partition, operating system, and/or the like to indicate that the switch to the new I/O adapter 104, including updating the I/O interrupt management structures, is complete.

In some embodiments, the configuration module 310 is configured to trigger the hypervisor, or other virtualization manager, to reset the second physical I/O adapter 104 and update configuration information for the second physical I/O adapter 104 based on the updated physical device information. The configuration information, for example, may be located and maintained in the hypervisor such that when the new I/O adapter 104 is installed, the hypervisor updates the device information in the device tree and the configuration module 310 triggers a reset, restart, initialization, or the like of the new I/O adapter 104.

In one embodiment, the configuration module 310 is further configured to update one or more internal structures of a device driver for the second physical I/O adapter 104 in response to the driver being aware of physical location information for the second physical I/O adapter 104. For example, if the operating system has access to information describing the physical location of the I/O adapter 104, such as via which physical port an SR-IOV virtual function is communicating, the migration flag in the EEH freeze data may trigger the configuration module 310 to update the internal device data structures with the updated I/O adapter 104 device information.

XIVE Example Embodiment

In one example embodiment, an information handling device 102 may implement an XIVE architecture for virtualizing I/O interrupts within a virtual environment hosted on the information handling device 102. In such an embodiment, when the adapter module 302 detects a change in an I/O adapter 104 (e.g., the removal of a current adapter 104 or the installation of a new adapter 104), the suspend module 308 notifies a logical partition of an "error" scenario, suspends I/O interrupts to/from the logical partition and the I/O adapter 104, and/or may freeze the virtual function that the logical partition/hypervisor accesses to use the I/O adapter 104 by entering an EEH mode.

Prior to the removal of the I/O adapter 104, the EAS 204 may maintain a mapping of PISNs to LISNs for the virtual function of the I/O adapter 104, the END 206 may define a unique notification path for the LISN for the virtual function, and for each END 206 an entry is created in the NVT 210 for presenting the I/O interrupt to the virtual processor/logical partition.

After the current I/O adapter 104 is removed, and the new I/O adapter 104 is installed, then the interrupt module 304 may update the I/O interrupt management structures. For instance, the interrupt module 304 may create a new mapping structure, or update an existing mapping structure, in the EAS 204 for mapping PISNs for the new I/O adapter 104 to LISNs for the logical partition. Further, the interrupt module 304 may define a new interrupt notification/routing path for the LISNs for the virtual function of the new I/O adapter 104.

The interrupt module 304 may further remove the LISN information, e.g., the interrupt routing path information associated with the removed I/O adapter 104 from each END 206 and removes the mapping table, or the entries in the mapping table, at the EAS 204 that maps PISNs for the removed I/O adapter 104 to LISNs for the logical partition.

In addition, the abstraction module 306 is configured to update the device information for the new I/O adapter 104, such as the device tree or other information (e.g., communication bus identifying information) that the hypervisor makes available to the logical partition, or device drivers for the logical partition. The configuration module 310 may then unconfigure the removed I/O adapter 104 so that it is not accessible to the logical partition (e.g., by removing any links, virtual functions, or other references to the removed I/O adapter 104). The hypervisor, or the configuration module 310, sets a migration indicator/flag in the EEH freeze data to indicate that the I/O interrupt management structures have been updated.

The configuration module 310, in further embodiments, as part of an EEH recovery mode, reconfigures the device configuration space, including MSI/MSI-X space, according to the device tree information and/or previous settings. Accordingly, the logical partition completes normal initialization of the new I/O adapter 104 such that the operating system, device drivers, and/or the like that run within the logical partition see the new I/O adapter 104 as the same I/O device as the removed I/O adapter 104 without requiring an add/remove operation, or the like. Further, the existing interrupt handlers 216, 220, 224 are still valid and do not required any changes.

Figure 4:
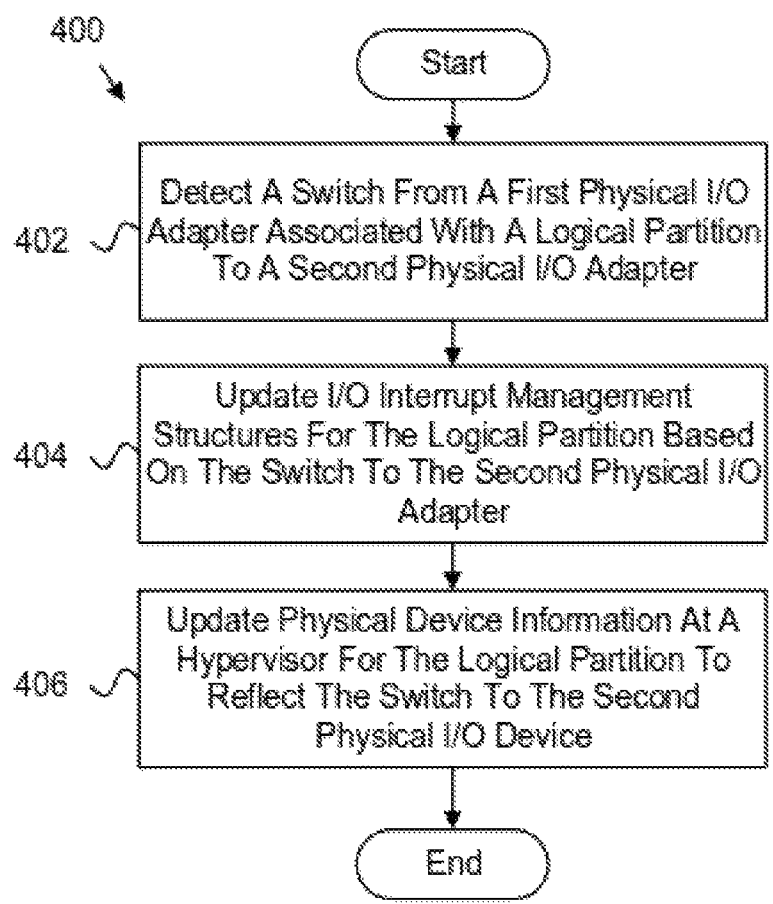
FIG. 4 is a schematic flow chart diagram illustrating one embodiment of a method for interrupt virtualization management.

FIG. 4 is a schematic flow chart diagram illustrating one embodiment of a method 400 for interrupt virtualization management. In one embodiment, the method 400 begins and detects 402 a switch from a first physical I/O adapter 104 associated with a logical partition to a second physical I/O adapter 104 associated with the logical partition. In certain embodiments, the method 400 updates 404 one or more I/O interrupt management structures for the logical partition so that the logical partition receives I/O interrupt information from the second physical I/O adapter 104 and not the first physical I/O adapter 104 without the logical partition being aware of the switch to the second I/O adapter 104. In some embodiments, the method 400 updates 406 physical device information at a hypervisor for the logical partition to reflect the switch to the second physical I/O device 104, and the method 400 ends.

Figure 5:
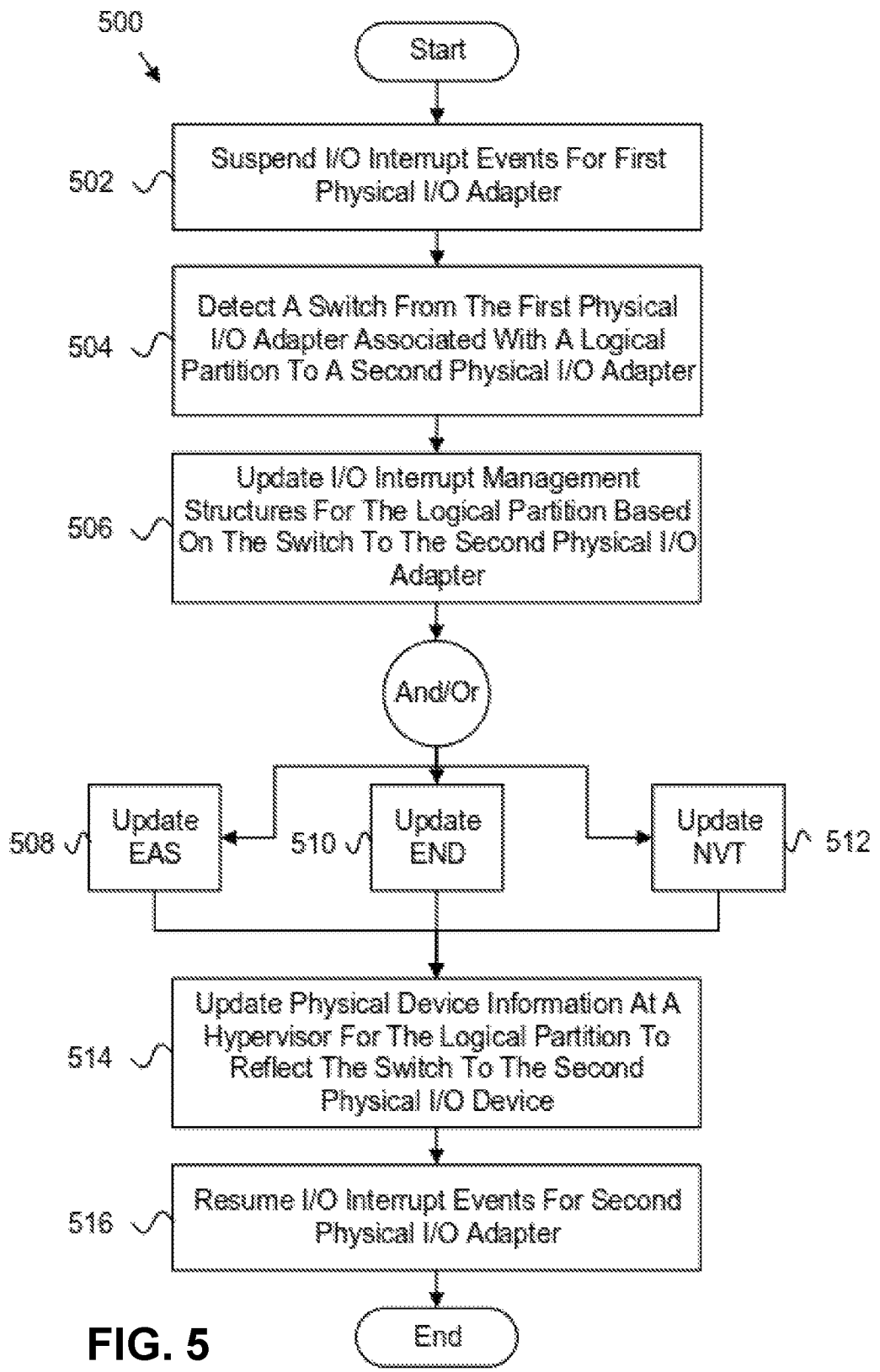
FIG. 5 is a schematic flow chart diagram illustrating one embodiment of another method for interrupt virtualization management.

FIG. 5 is a schematic flow chart diagram illustrating one embodiment of another method 500 for interrupt virtualization management. In one embodiment, the method 500 begins and suspends 502 I/O interrupt events between the logical partition and the first physical I/O adapter 104 prior to switching to the second physical I/O adapter 104. In further embodiments, the method 500 detects 504 a switch from a first physical I/O adapter 104 associated with a logical partition to a second physical I/O adapter 104 associated with the logical partition.

In some embodiments, the method 500 updates 506 one or more I/O interrupt management structures for the logical partition so that the logical partition receives I/O interrupt information from the second physical I/O adapter 104 and not the first physical I/O adapter 104 without the logical partition being aware of the switch to the second I/O adapter 104. For instance, the method 500 may update 508 an EAS 204, may update 510 an END 206, and/or may update 512 an NVT 210 to reflect the changed I/O adapter (e.g., the changes for PISNs, LISNs, interrupt routing paths, or the like).

In one embodiment, the method 500 updates 514 physical device information at a hypervisor for the logical partition to reflect the switch to the second physical I/O device 104. The method 500, in certain embodiments, resumes 516 I/O interrupt events between the logical partition and the second physical I/O adapter 104 in response to updating the one or more I/O interrupt management structures, and the method 500 ends.

Interrupt Migration

It may also be desirable in some embodiments to utilize the herein-described functionality to migrate a logical partition's interrupts associated with one or more physical I/O devices to other physical I/O devices in association with migration of the logical partition to a different host or system, and doing so in a manner as to preserve data integrity and logical partition operation, and to avoid the need for an operating system to have any specific support for such an operation, while allowing the operating system to believe it is still connected to the same physical I/O device.

Figure 6:
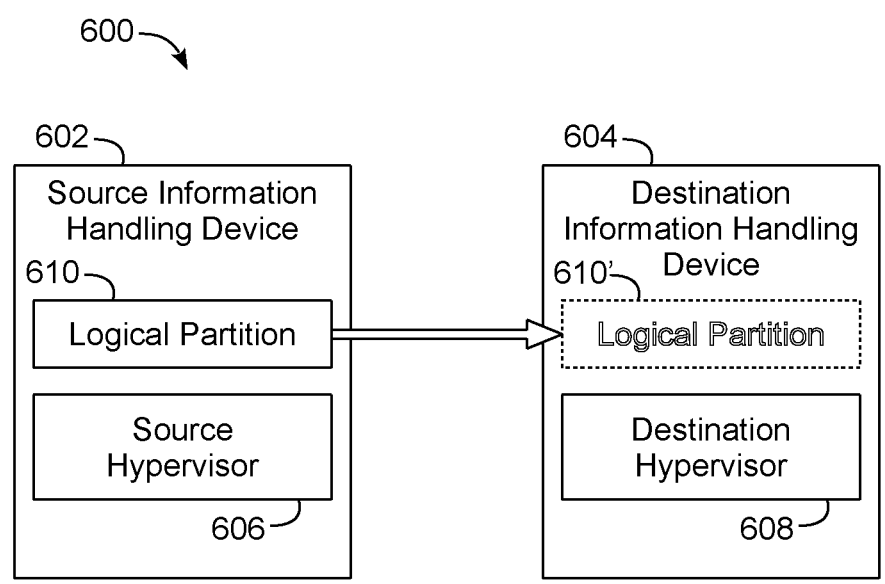
FIG. 6 is a schematic block diagram illustrating one embodiment of a system for interrupt migration.

In the embodiments discussed below, hypervisors in each host/system may virtualize interrupt source numbers (ISNs) so that only the hypervisor knows the system-wide ISN/physical ISN (PISN), and each logical partition may have a corresponding Logical ISN (LISN) for each PISN that is assigned to/owned by the logical partition. FIG. 6, for example, illustrates an example system 600 including first and second hosts 602, 604, each of which may be configured as an information handling device similar to information handling device 102 discussed above, and each of which includes a corresponding hypervisor 606, 608.

Also illustrated is a logical partition 610 to be migrated from host 602 to host 604 (e.g., as illustrated in phantom at 610'), and thus, for the purposes of this migration, host 602 is referred to as a source host and hypervisor 606 is referred to as a source hypervisor, while host 604 is referred to as a destination host and hypervisor 608 is referred to as a destination hypervisor. It will be appreciated, however, that the references to source and destination are merely for the purposes of discussing the migration of logical partition 610, as either host 602, 604 can service as a source or destination for other migrations.

Each host 602, 604 may incorporate an interrupt management apparatus 120 similar to that described above in connection with FIGS. 3-5, but extended to support interrupt migration between I/O devices connected to different hosts. Distribution of the functionality discussed above in connection with FIGS. 3-5 between interrupt management apparatuses disposed in source and destination hosts would be well within the abilities of those of ordinary skill having the benefit of the instant disclosure.

Figure 7:
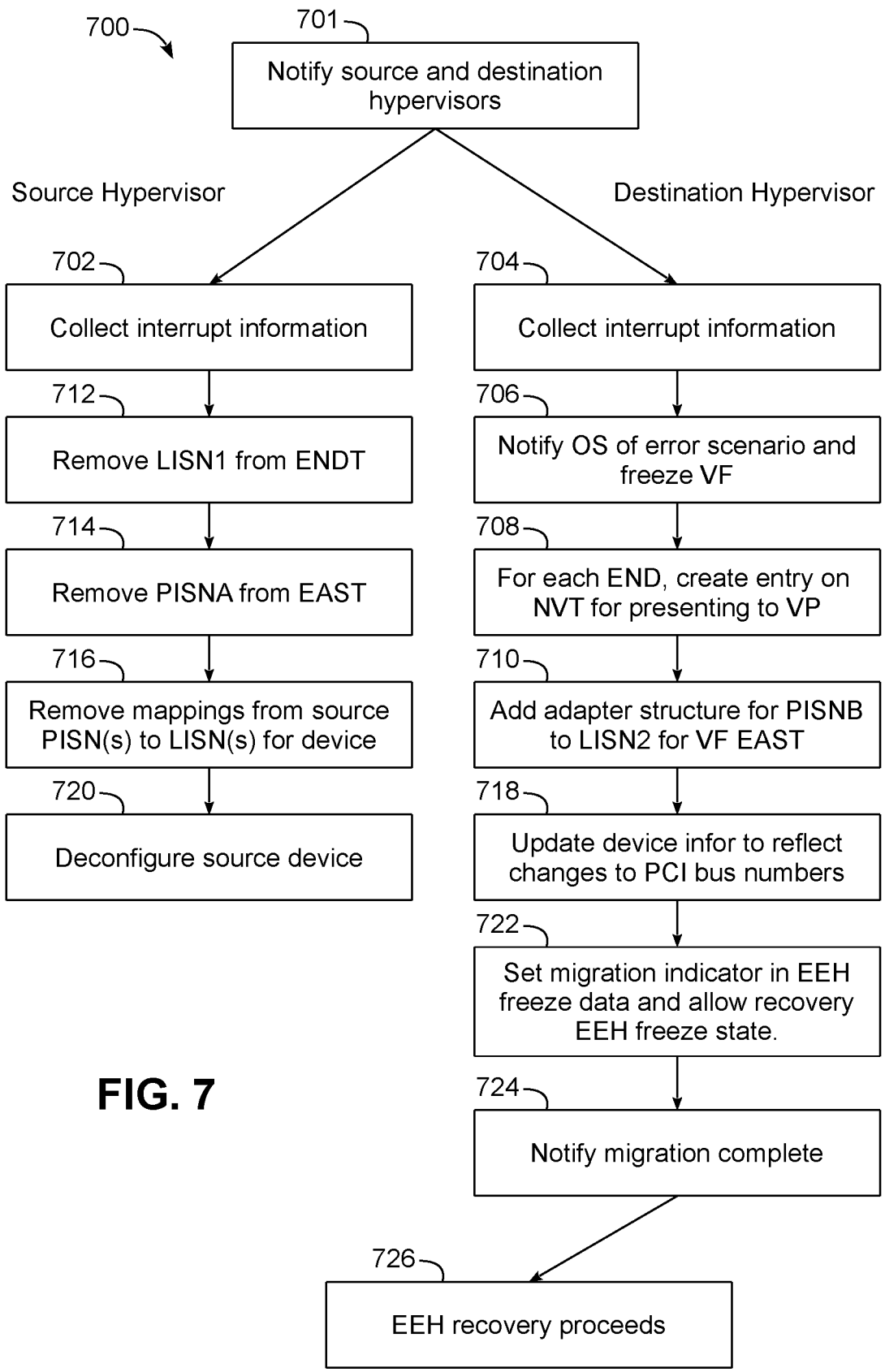
FIG. 7 is a schematic flow chart diagram illustrating one embodiment of a method for interrupt migration.

As an example, FIG. 7 is a schematic flow chart diagram illustrating one embodiment of a method 700 for interrupt migration consistent with the invention. Method 700 may be initiated in response to a user or other controlling entity identifying source and destination devices for which an interrupt migration is desired, and may be performed, for example, in response to a logical partition migration from a source host to a destination host, and as one or more steps in an overall logical partition migration operation, which may be performed serially or in parallel with other operations performed in connection with a logical partition migration. Such other operations utilized to migrate the logical partition itself would readily be understood by those of ordinary skill having the benefit of the instant disclosure, and as such, will not be discussed in detail herein.

As illustrated in block 701, method 700 begins with the user or other controlling entity contacting the source hypervisor and destination hypervisor to initiate the interrupt migration operation. This may be configurable through a management console or may be done as part of a preconfigured or dynamic set of rules in various embodiments.

Next, in blocks 702 and 704 the source and destination hypervisors collect interrupt information, and then in block 706, the destination hypervisor indicates to the operating system an error scenario and puts the virtual function in a freeze state.

For the purposes of this discussion, it may be assumed that the source host includes a mapping for the interrupt to be migrated that maps a PISNA to an LISN1 for the virtual function in EAST, and that a migration is to occur to a PISNB that will be mapped to an LISN2. In the destination hypervisor, the source adapter structure that maps PISNA to LISN1 for the virtual function is maintained in EAST, and the ENDT structure defines a unique notification path for LISN1 for the virtual function. In block 708, the destination hypervisor creates an entry on the NVT for each END for presenting to the virtual processor (VP). Then, in block 710, the destination hypervisor adds the adapter structure for a PISNB to LISN2 mapping for the virtual function EAST, such that an ENDT structure defines a unique notification path for LISN2 for the virtual function on the destination host.

Next, as illustrated in blocks 712-716, in parallel with (or otherwise independent of) the destination hypervisor, the source hypervisor may remove LISN1 from ENDT (block 712), remove PISNA from EAST (block 714), and then remove the mappings from the source PISN(s) to the LISN(s) for the device (block 716).

Next, in block 718, the destination hypervisor may update the device information (e.g., the device tree and information retrieved via calls to the hypervisor or equivalent) to reflect changes to PCI bus numbers. It will be appreciated that these PCI bus numbers may not be used directly by the device driver in the logical partition, and as such these changes generally don't impact device driver EEH recovery, as the platform firmware generally abstracts these from the device driver.

Next, in block 720, the source hypervisor deconfigures the source device, and then in block 722, the destination hypervisor sets a migration indicator in the EEH freeze data, which allows the logical partition to recover the EEH freeze state. Then, in block 724, the destination hypervisor notifies the controlling entity that the migration has completed.

Block 726 next illustrates the EEH recovery proceeding on the destination host. During this process, the device driver in the logical partition generally requests the destination hypervisor to assert/deassert device (PCI function) reset, and to reconfigure the PCIe device configuration space according to the device tree information and previous settings. This may also include configuring the MSI/MSI-X space.

The driver may then complete normal initialization of the PCIe device, which the operating system and device driver will generally see as the same I/O device (PCI function), thereby avoiding the need for the equivalent of an add/remove operation. The existing interrupt handler registrations are still valid, and no changes generally need to be performed. Moreover, if the driver or operating system is cognizant of physical location information, such as via which physical port an SR-IOV Virtual Function (VF) is communicating, the migration indicator in the freeze data may trigger the driver to update internal structures. For a migration of a full physical device, this generally would not be required.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    an adapter module that detects a switch from a first physical input/output ("I/O") adapter coupled to a first host device and associated with a logical partition resident in the first host device to a second physical I/O adapter coupled to a second host device that is separate from the first host device and to which the logical partition is being migrated;
    an interrupt module that updates one or more I/O interrupt management structures for the logical partition in connection with migration of the logical partition to the second host device such that the logical partition after the migration receives I/O interrupt information from the second physical I/O adapter and not the first physical I/O adapter without the logical partition being aware of the switch to the second physical I/O adapter; and
    an abstraction module that updates physical device information at a hypervisor for the logical partition and resident in the second host device to reflect the switch to the second physical I/O device,
    wherein at least a portion of said modules comprise one or more of hardware circuits, programmable hardware devices and executable code, the executable code stored on one or more computer readable storage media.

2. The apparatus of claim 1, wherein updating the one or more I/O interrupt management structures for the logical partition comprises:
    adding I/O interrupt information for the second physical I/O device to one or more I/O interrupt management structures resident in the second host; and
    removing interrupt information for the first physical I/O device from one or more I/O interrupt management structures resident in the first host.

3. The apparatus of claim 1, wherein the one or more I/O interrupt management structures are part of an external interrupt virtualization engine ("XIVE") architecture.

4. The apparatus of claim 3, wherein one of the one or more I/O interrupt management structures comprises an event assignment structure ("EAS") that maps a physical interrupt source number for the second physical I/O adapter to a logical interrupt source number for the logical partition.

5. The apparatus of claim 4, wherein one of the one or more I/O interrupt management structures comprises an event notification descriptor ("END") structure that defines an interrupt notification routing path for the logical interrupt source number for the second physical I/O adapter.

6. The apparatus of claim 5, wherein one of the one or more I/O interrupt management structures comprises a notification virtual target ("NVT") structure that tracks I/O interrupt events that use the interrupt notification routing path for the logical interrupt source number for the second physical I/O adapter.

7. The apparatus of claim 1, further comprising a suspend module that:
  suspends I/O interrupt events between the logical partition and the first physical I/O adapter in connection with the migration and prior to switching to the second physical I/O adapter; and
  resumes I/O interrupt events between the logical partition and the second physical I/O adapter in response to updating the one or more I/O interrupt management structures.

8. The apparatus of claim 7, wherein the I/O interrupt events between the logical partition and the first physical I/O adapter are suspended in response to detecting an extended error handling ("EEH") event in the first host.

9. The apparatus of claim 8, wherein the I/O interrupt events between the logical partition and the second physical I/O adapter are resumed as part of an EEH recovery event in the second host.

10. The apparatus of claim 9, further comprising a configuration module that, during the EEH recovery event:
  sets a flag indicating completion of the switch from the first physical I/O adapter to the second physical I/O adapter in response to updating the one or more I/O interrupt management structures for the logical partition and the second physical I/O adapter;
  sends a notification that the switch from the first physical I/O adapter to the second physical I/O adapter is complete; and
  triggers the hypervisor to reset the second physical I/O adapter and update configuration information for the second physical I/O adapter based on the updated physical device information.

11. The apparatus of claim 10, wherein the configuration module is further configured to update one or more internal structures of a device driver for the second physical I/O adapter in response to the driver being aware of physical location information for the second physical I/O adapter.

12. The apparatus of claim 1, wherein the abstraction module is configured to update the physical device information at the hypervisor by one or more of updating a device tree and updating device information that is retrievable from the hypervisor, the device information comprising communication bus identifiers for the second physical I/O adapter.

13. The apparatus of claim 1, wherein the first and second physical I/O adapters comprise peripheral component interconnect ("PCI") devices that are of a same type.

14. A method, comprising:
  detecting a switch from a first physical input/output ("I/O") adapter coupled to a first host device and associated with a logical partition resident in the first host device to a second physical I/O adapter coupled to a second host device that is separate from the first host device and to which the logical partition is being migrated;
  updating one or more I/O interrupt management structures for the logical partition in connection with migration of the logical partition to the second host device such that the logical partition after the migration receives I/O interrupt information from the second physical I/O adapter and not the first physical I/O adapter without the logical partition being aware of the switch to the second physical I/O adapter; and
  updating physical device information at a hypervisor for the logical partition and resident in the second host device to reflect the switch to the second physical I/O device.

15. The method of claim 14, wherein updating the one or more I/O interrupt management structures for the logical partition comprises:
  adding I/O interrupt information for the second physical I/O device to one or more I/O interrupt management structures resident in the second host; and
  removing interrupt information for the first physical I/O device from one or more I/O interrupt management structures resident in the first host.

16. The method of claim 14, wherein the one or more I/O interrupt management structures are part of an external interrupt virtualization engine ("XIVE") architecture.

17. The method of claim 16, wherein one of the one or more I/O interrupt management structures comprises an event assignment structure ("EAS") that maps a physical interrupt source number for the second physical I/O adapter to a logical interrupt source number for the logical partition.

18. The method of claim 17, wherein one of the one or more I/O interrupt management structures comprises an event notification descriptor ("END") structure that defines an interrupt notification routing path for the logical interrupt source number for the second physical I/O adapter.

19. The method of claim 18, wherein one of the one or more I/O interrupt management structures comprises a notification virtual target ("NVT") structure that tracks I/O interrupt events that use the interrupt notification routing path for the logical interrupt source number for the second physical I/O adapter.

20. A computer program product for interrupt virtualization, the computer program product comprising a computer readable storage medium having program instructions embodied therewith, the program instructions executable by a processor to cause the processor to:
  detect, by processor, a switch from a first physical input/output ("I/O") adapter coupled to a first host device and associated with a logical partition resident in the first host device to a second physical I/O adapter coupled to a second host device that is separate from the first host device and to which the logical partition is being migrated;
  update, by a processor, one or more I/O interrupt management structures for the logical partition in connection with migration of the logical partition to the second host device such that the logical partition after the migration receives I/O interrupt information from the second physical I/O adapter and not the first physical I/O adapter without the logical partition being aware of the switch to the second physical I/O adapter; and
  update, by a processor, physical device information at a hypervisor for the logical partition and resident in the second host device to reflect the switch to the second physical I/O device.

* * * * *